Feb. 27, 1951 R. M. M. OBERMAN 2,543,050
VARIABLE VOLTAGE SELECTOR
Filed Aug. 6, 1947
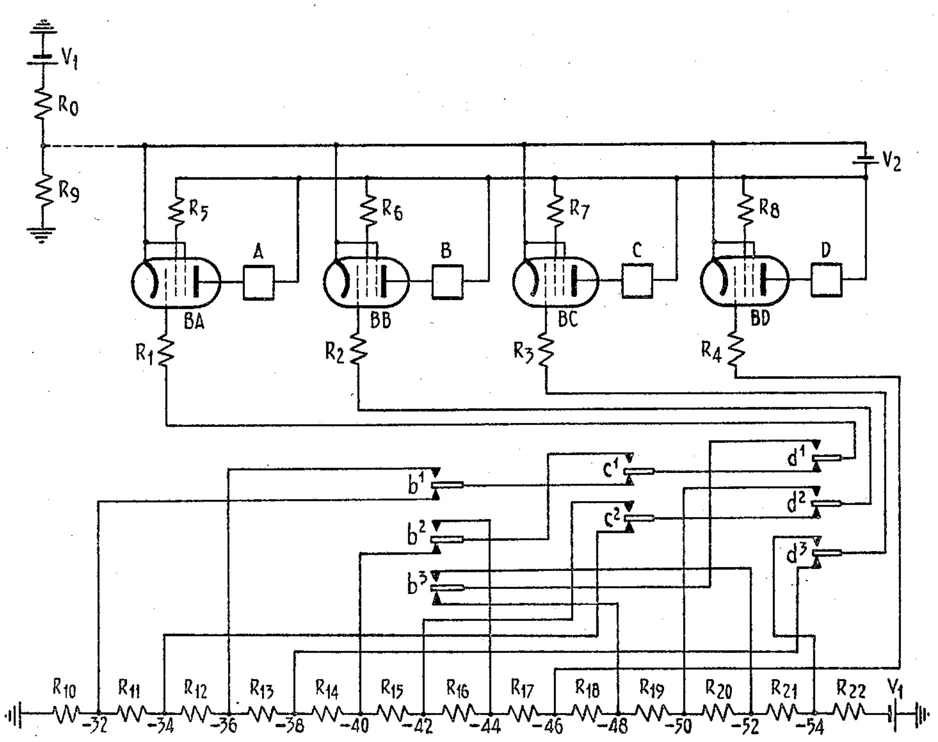
Inventor
Roelof M. M. Oberman
By [illegible]
Agent Patented Feb. 27, 1951

2,543,050

UNITED STATES PATENT OFFICE 2,543,050

VARIABLE VOLTAGE SELECTOR

Roelof M. M. Oberman, The Hague, Netherlands

Application August 6, 1947, Serial No. 767,536
In the Netherlands April 25, 1944

Section 1, Public Law 690, August 8, 1946
Patent expires April 25, 1964

2 Claims. (Cl. 178—74)

The invention refers to a receiving circuit for signalling system in which criteria are transmitted by a bridge marking method.

The use of marking switches and relay counting chains as finder devices results in finding times of such magnitudes that the keys of the subscriber sets effecting control have to be locked mechanically or electrically to prevent the contact time becoming too small.

The purpose of the invention is to provide a receiving circuit requiring minimum outlay and acting so rapidly, even for great numbers of transmittable criteria (e. g. 32), that no locking of any keys is required.

Such a rapid receiving circuit might for instance be obtained by providing for each transmittable criterion a single test tube and a single relay in the anode circuit of that tube, the comparison voltages being taken for all tubes from a single potentiometer having the necessary taps.

Though in such a receiving circuit the finder devices corresponding to transmitted criteria will react immediately many parts would be required for the circuit.

The receiving circuit of the invention has a number of finder devices smaller than the number of criteria to be transmitted by the use of $n$ finder devices which may record signals in operating combinations of $n$ corresponding relays and which devices come into operation on the voltage reaching a certain value with regard to the comparison voltage, these devices augmenting by their relay the comparison voltage of all lower numbered devices by a voltage equal to the lowest signalling voltage required for the operation of the device concerned, diminished by the normal voltage.

When using $n$ finder devices $2^n$ signals may be transmitted the normal condition being reckoned as a signal.

The receiver according to the invention may be used in all kinds of signalling systems. In telephone systems the circuit will be preferably coupled to a number recording device consisting of groups of four relays. The received digit may in such a system be easily recognized by assigning e. g. values 1, 2, 4 and 8 to the relays and by so choosing the criteria to be transmitted that the sum of the value of the operated relays is equal to the transmitted number.

The invention will now be explained in detail with reference to the annexed figure showing an embodiment of a receiver for a register for a telephone or telegraph system. It may also be used in conjunction with graphic or printing devices whereby a complete telegraph apparatus will be obtained showing higher signalling velocity at lower transmitting velocity than usual.

The signal sender is represented in the figure by the potentiometer $R_0$—$R_9$ yielding e. g. at voltage of source V1 of 60 volts and with intervals of e. g. 2 volts the several signalling criteria —30, 32, 34 . . . to —50 volts incl.

The receiving circuit of the invention may e. g. be in normal condition the signal sender indicating —30 volts. For the recording of 15 criteria the receiver consists of tubes BA to BD incl. and of the four relays A–D incl. and also of a potentiometer comprising resistances $R_{10}$–$R_{22}$ incl. The circuit of the figure is designed for the reception and detection of 11 signals only, as will be sufficient when considering a bridge marking telephone system.

The cathode of tubes BA to BD are commoned to the conductor leading to the signal sender.

Relays A–D are inserted in the anode circuits of the corresponding tubes fed in common by source V2, the control grids of these tubes being connected via protecting resistances $R_1$ to $R_4$ incl. and via relays A–D contacts to several potentials also obtained from source V1 by means of the potentiometer $R_{10}$–$R_{22}$ incl.

The potentials which may be indicated by resistances $R_{10}$–$R_{22}$ are for instance selected as indicated in the figure so that in normal condition, when the sender transmits a voltage of —30 volts, tubes BA—BD have negative grid voltages of resp. —2, —4, —8 and —16 volts. The tubes should be non-conductive at this negative grid voltage.

Preferably pentodes having small grid swing and considerable mutual conductance are chosen. If tubes are at hand which are non-conductive at e. g. —4 volts bias and are conductive at —2 volts the comparison voltages of potentiometer $R_{10}$–$R_{22}$ should be so far displaced that tubes BA—BD have negative grid voltages of —4, —6, —10 and —18 volts in the condition of those signals.

The following discussion maintains its validity when all grid voltages mentioned are displaced by —2 volts.

The emission of the signalling criterion indicated by potentiometer $R_0$—$R_9$ at 32 volts reduces only the bias of tube BA to zero rendering its conductive and operating relay A.

Indicating the voltage of —34 volts by potentiometer $R_0$—$R_9$ renders tubes BA and BB conductive. Relay B operates in the anode circuit of tube BB. Contact *b1* connects the control grid of tube BA to a voltage of —36 volts from potentiometer $R_{10}$–$R_{22}$. This tube is thus brought back to non-conductive condition so that only tube BB remains conductive and relay B operated. If −36 volts are indicated by the potentiometer tubes BA and BB will again pass current but now tube BA will remain conductive on the operation of contact *b1*, relay A and B both remaining operated.

If described the sender indicates −38 v. only tube BC will remain conductive, as may be easy seen from the figure, relay C now being operated. Contacts *c1* and *c2* connect the control grids of tubes BA and BB to such potentials that these are rendered non-conductive, demagnetising relays A and B, if operated before.

At the signal voltage of −40 volts relays A and C remain operated, for −42 volts relays B and C, for −44 volts relays A, B and C, for −46 volts relay D, for −48 volts relays A and D, for −50 volts B and D.

If to relays A, B, C and D values 1, 2, 4 and 8 are assigned the sum of the values of the magetised relay yields the number of the signalling criterion transmitted. The recording code is thus the same as used in the relay counting change of U. S. Patent Application Serial No. 768,028, filed August 4, 1947. Relays A—D may thus be operated in all possible combinations if 15 different criteria are signalled. A receiving circuit according to the invention comprising $n$ relays may receive $2^n$ criteria, normal condition being included. The circuit is thus composed of the minimum number of elements. For special purposes application of the principle of the invention may result in suitable recording codes.

The operating times of relays A—D may suitably be chosen so that the relays of highest number attract first whereby unnecessary operation of lower value relays is prevented. Relay D may e. g. operate in 10 milliseconds, relays A—C operating in e. g. 25, 20 and 16 milliseconds, respectively. The transmission of the entire criterion thus takes 25 milliseconds.

When operated in succession relays A—D may close circuits for register relay (not shown). If successive operation is not ensured by providing suitable operating delay means should be added to the receiver for registering at a certain moment of e. g. 40 milliseconds after leaving normal condition the operated combination of relays A—D then certainly present in registering relays.

It is observed that gas tubes might be used in a suitable modification of the circuit.

When using separate anode sources the control grid of tube BA—BD may be commoned to the signalling conductor with the insertion of protecting resistances $R_1$–$R_4$, the cathode of these tubes being connected to the potentiometer $R_{10}$–$R_{22}$ voltages via relays A—D switching contacts.

The number of contacts on relays A—D may be reduced by switching-in or by shorting the required portions of the comparison voltage potentiometer by break or make contacts of these relays.

While I have illustrated and described what I regard to be the preferred embodiment of my invention, nevertheless it will be understood that such is merely exemplary and that numerous modifications and rearrangements may be made therein without departing from the essence of the invention, I claim:

1. Receiving device for an electric transmission system comprising, a plurality of tubes each having a cathode, grid and anode; means for imparting a variable potential to all said cathodes; means for imparting, respectively, to said grids potentials forming a geometrical progression; relays connected, respectively, in the anode circuits of each of said tubes; and contacts being, respectively, under control of said relays and arranged in the grid circuits of said tubes for changing the potential imparted at least to one of said grids, the contacts operated by a given relay effecting the grid bias on the preceding tubes.

2. Receiving device for an electric transmission system comprising, a plurality of successive stages each including a tube each having a cathode, grid and anode; means for imparting a variable potential to all said cathodes; means for imparting, respectively, to said grids potentials forming a geometrical progression; relays connected, respectively, in the anode circuits of each of said tubes; and contacts in said stages being, respectively, under control of said relays of said succeeding stages and arranged in the grid circuits of said tubes for changing the potential imparted at least to one of said grids.

ROELOF M. M. OBERMAN.

REFERENCES CITED

The following references are of record in the file of this patent:

UNITED STATES PATENTS

| Number | Name | Date |
|---|---|---|
| 1,801,657 | Buyko | Apr. 21, 1931 |
| 1,982,290 | Gardner | Nov. 27, 1934 |
| 2,008,563 | Sarbey | July 16, 1935 |
| 2,384,336 | Pfleger | Sept. 4, 1945 |